United States Patent
Baitinger et al.

(10) Patent No.: US 10,159,176 B2
(45) Date of Patent: Dec. 25, 2018

(54) CROP INPUT VARIETY SELECTION SYSTEMS, METHODS, AND APPARATUS

(71) Applicant: Monsanto Technology LLC, St. Louis, MO (US)

(72) Inventors: David J. Baitinger, St. Louis, MO (US); Eric L. Borrowman, St. Louis, MO (US); Chad A. Heathcote, St. Louis, MO (US); Andrew D. Thielen, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 2 days.

(21) Appl. No.: 15/545,467

(22) PCT Filed: Dec. 21, 2015

(86) PCT No.: PCT/US2015/067023
§ 371 (c)(1),
(2) Date: Jul. 21, 2017

(87) PCT Pub. No.: WO2016/118277
PCT Pub. Date: Jul. 28, 2016

(65) Prior Publication Data
US 2018/0000009 A1    Jan. 4, 2018

Related U.S. Application Data

(60) Provisional application No. 62/106,374, filed on Jan. 22, 2015.

(51) Int. Cl.
*A01C 7/10* (2006.01)
*A01C 7/04* (2006.01)
(Continued)

(52) U.S. Cl.
CPC .............. *A01C 7/105* (2013.01); *A01C 7/046* (2013.01); *A01C 21/00* (2013.01); *A01C 21/005* (2013.01);
(Continued)

(58) Field of Classification Search
CPC ........... A01C 7/105; A01C 7/102; A01C 7/10; A01C 7/08; A01C 7/00; A01C 7/046;
(Continued)

(56) References Cited

U.S. PATENT DOCUMENTS 2,991,909 A    7/1961    Lamazou et al.
3,796,346 A    3/1974    Ribouleau
(Continued)

FOREIGN PATENT DOCUMENTS

GB    1113476 A    5/1968
WO    2012129442 A2    9/2012
WO    2016025848 A1    2/2016

OTHER PUBLICATIONS

International Search Report from corresponding PCT/US2015/067023 dated May 17, 2016.

*Primary Examiner* — Christopher J. Novosad
(74) *Attorney, Agent, or Firm* — Sandber Phoenix & von Gontard P.C.

(57) ABSTRACT

A seed meter comprising a seed handler comprising a cylinder comprising a plurality of seed chambers. The seed handler rotates the cylinder to sequentially position each seed chamber in a 'loading' position wherein each seed chamber receives a sets of seeds, a 'planting' position wherein seeds from each seed set are parsed, and an 'evacuation' position wherein any seeds remaining in each chamber are evacuated from each chamber. The seed meter additionally comprises a seed separator comprising a seed disc. The seed disc rotates, parses seed from each seed (Continued)

chamber, and transports the seeds to the exit chute. Importantly, the seed meter is structured and operable to substantially simultaneously, receive the sets of seed in the respective chamber positioned in the 'loading' position, parse the seeds from the respective chamber positioned in the 'planting' position, and evacuate the remaining seed from the respective chamber positioned in the 'evacuation' position.

22 Claims, 12 Drawing Sheets

(51) Int. Cl.
    *A01C 21/00* (2006.01)
    *A01C 5/06* (2006.01)
    *A01C 7/20* (2006.01)
    *A01C 15/00* (2006.01)

(52) U.S. Cl.
    CPC .............. *A01C 5/064* (2013.01); *A01C 5/068* (2013.01); *A01C 7/206* (2013.01); *A01C 15/006* (2013.01)

(58) Field of Classification Search
    CPC ........... A01C 7/044; A01C 7/042; A01C 7/04; A01C 21/00; A01C 21/005; A01C 5/064; A01C 5/062; A01C 5/06; A01C 5/00; A01C 5/068; A01C 5/066; A01C 7/206; A01C 7/20; A01C 15/006; A01C 15/005; A01C 15/00
    See application file for complete search history.

(56) References Cited

U.S. PATENT DOCUMENTS

| | | |
|---|---|---|
| 5,740,747 A | 4/1998 | Stufflebeam et al. |
| 7,673,572 B2 | 3/2010 | Deppermann et al. |
| 7,775,167 B2 | 8/2010 | Stehling et al. |
| 8,386,137 B2 | 2/2013 | Sauder et al. |
| 9,635,799 B2 | 5/2017 | Hundley et al. |
| 2002/0062771 A1 | 5/2002 | Unruh et al. |

CROP INPUT VARIETY SELECTION SYSTEMS, METHODS, AND APPARATUS

CROSS-REFERENCE TO RELATED APPLICATIONS

This application is a National Stage of International Application No. PCT/US2015/067023, filed Dec. 21, 2015, which claims the benefit of U.S. Provisional Application No. 62/106,374, filed on Jan. 22, 2015. The disclosures of which are incorporated herein by reference in their entirety.

FIELD

The present teachings relate to agricultural planting systems, and more particularly to high-throughput seed handler for such planting systems.

BACKGROUND

The statements in this section merely provide background information related to the present disclosure and may not constitute prior art.

In various instances, plant researchers cultivate thousands or tens of thousands of small plots with numerous different seed types, each seed type having different genotypic and/or phenotypic traits and/or selected treatment applied thereto. A field can comprise a plurality of plots and each plot is typically planted with a single selected seed type such that each plot is planted with different seed type. Accordingly, as the breeder plants one plot and proceeds to a subsequent plot, the seed being planted must be changed such that a different seed type will be planted in the subsequent plot and the seed planted in the prior plot will cease to be planted.

Often automated and/or mechanized planting systems (e.g., automated planters) comprise automated seed meters that are used to plant a large number of plots, with each plot being planted with a respective selected seed type. The seed meters are generally operable to precisely drop seeds at specific intervals into a respective furrow as the planter moves down a respective row. Precise and even seed metering is crucial to optimizing and/or testing the yield produced by a particular seed type in a research growing operation. Particularly, when moving between plots, the seed meters of such automated planters must cease planting one seed type, isolate or discharge that seed type from the system, and then begin planting the subsequent selected seed type in the subsequent plot. Various known seed meters can accomplish the seed switching procedure, e.g., the steps listed above, in a variety of ways, but none are designed to perform procedure rapidly. Particularly, current seed meters require slow planting rates in research setting in order to ensure highly-accurate placement of several different seed types in a large plant research setting. For example, some known planters are capable of reliably metering seeds while moving through the field at four to five miles per hour, but are unable to reliably switch to a new type of seed and maintain type separation between plots without slowing the planter down to approximately half that speed.

In commercial growing operations, this is not normally a problem, as several acres of one seed type are typically planted before it becomes necessary to slow or pause the planter to switch to another seed type. Even if the operator must wait or slow planting for a few seconds a dozen times in a large commercial field, the overall loss in efficiency is typically negligible, and so there is little motivation to improve these systems.

However, plant researchers attempting to test the performance of large numbers of seed types commonly plant dozens or hundreds of different seed types per acre in separated plots. Operators planting these research testing fields waste a much greater portion of their overall planting time waiting for planters with current seed meters to switch out seed types. Even if operators must wait only a few seconds between each research plot, the delays rapidly add up in a large breeding program where thousands or tens of thousands of such plots are planted. Furthermore, it is common that plots of separated seed are relatively short (e.g., less than 30 feet) that the most efficient way to plant such a research testing configuration using current meters is to plant the entire field at the reduced planting rate to accommodate the inefficiency of the respective meter to switch seeds. This reduced planting rate results in dramatic increases in operating costs, labor, ergonomic issues and cost of product development.

SUMMARY

In various embodiments the present disclosure provides a seed meter comprising a seed handler, wherein the seed handler comprises a cylinder, and the cylinder comprises a plurality of seed chambers. The seed handler is structured and operable to incrementally rotate the cylinder to sequentially position each seed chamber in a 'loading' position wherein each seed chamber receives a sets of seeds, sequentially position each seed chamber in a 'planting' position wherein a particular number of seeds from each seed set are parsed from each seed chamber and transported to an exit chute for planting, and sequentially position each seed chamber in an 'evacuation' position wherein any seeds remaining in each chamber after parsing are evacuated from each chamber. The seed meter additionally comprises a seed separator operably coupled to the seed handler. The seed separator comprises a seed disc rotationally disposed within a separator housing, wherein the seed disc comprises a plurality of seed apertures disposed along an outer edge portion of the seed disc. The seed separator is structured and operable rotate the seed disc such that seeds from each seed set are entrained on the seed apertures, via a vacuum supplied at each seed aperture, to parse the particular numbers of seed from each seed chamber and transport the seeds to the exit chute as each seed chamber is incrementally rotated into the 'planting' position.

Importantly, the seed meter is structured and operable to substantially simultaneously, receive the sets of seed in the respective chamber positioned in the 'loading' position, parse the seeds from the respective chamber positioned in the 'planting' position, and evacuate the remaining seed from the respective chamber positioned in the 'evacuation' position.

This summary is provided merely for purposes of summarizing some example embodiments of the present disclosure so as to provide a basic understanding of some aspects of the teachings herein. Accordingly, it will be appreciated that the above described example embodiments are merely examples and should not be construed to narrow the scope or spirit of the disclosure in any way.

DRAWINGS

Figure 9:
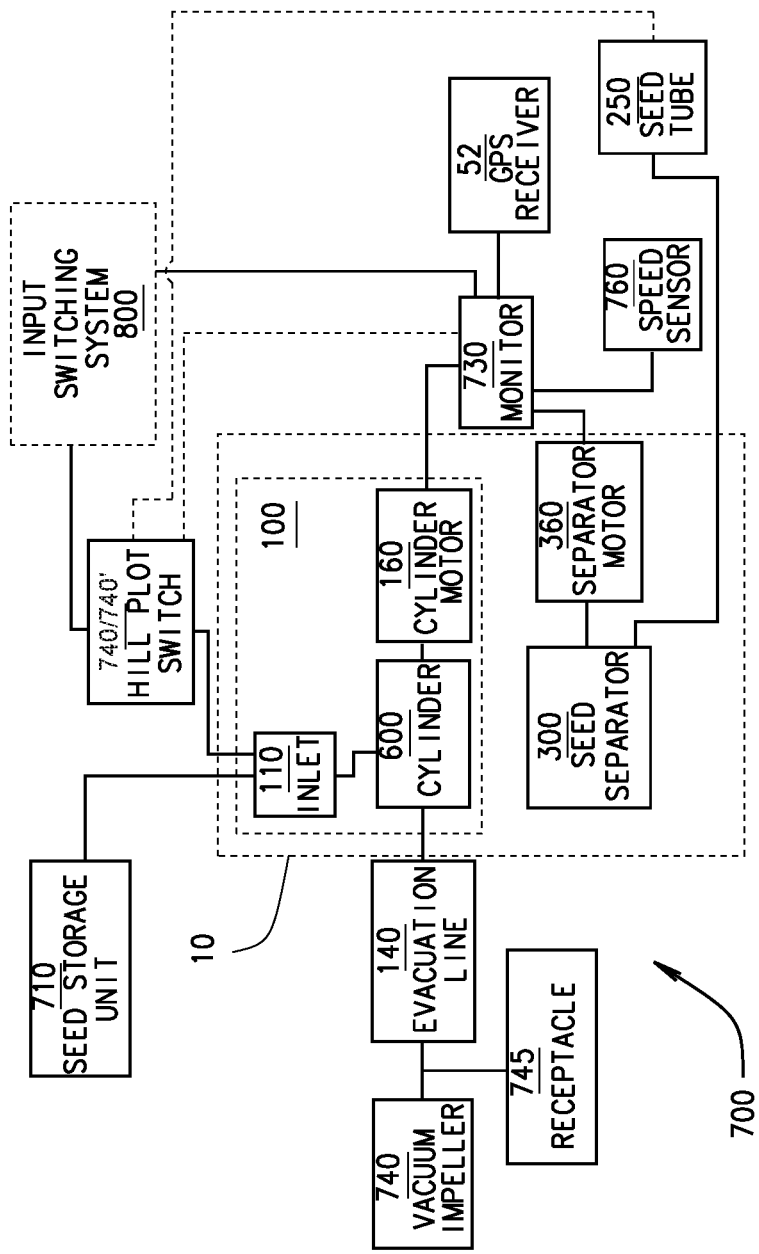

FIG. 9 schematically illustrates an embodiment of a portion of an agricultural planting system, in accordance with various embodiments of the present disclosure.

Figures 10, 11:
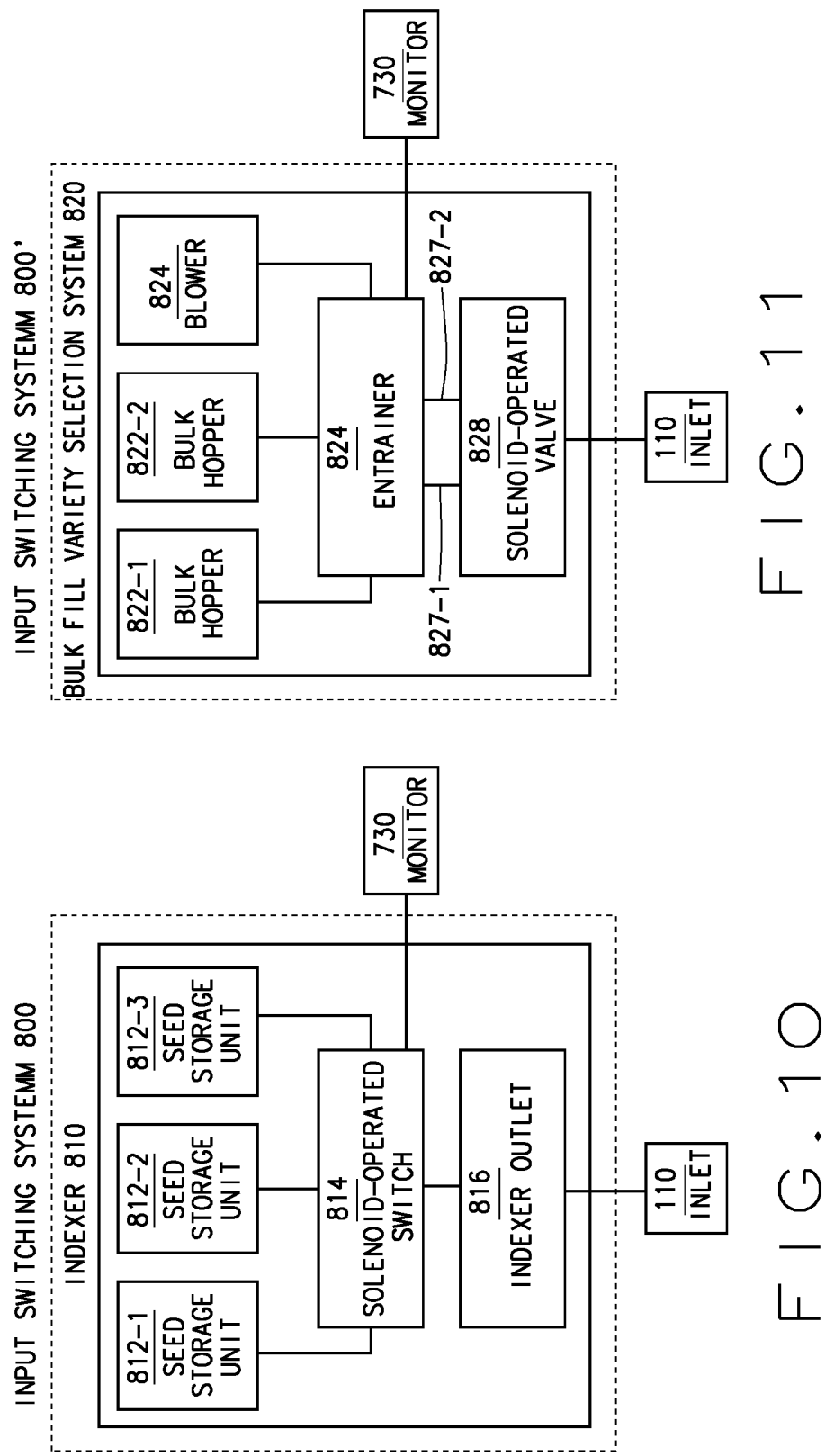

FIG. 10 schematically illustrates an embodiment of an input switching system, in accordance with various embodiments of the present disclosure.

FIG. 11 schematically illustrates an input switching system, in accordance with various other embodiments of the present disclosure.

Figure 12A:
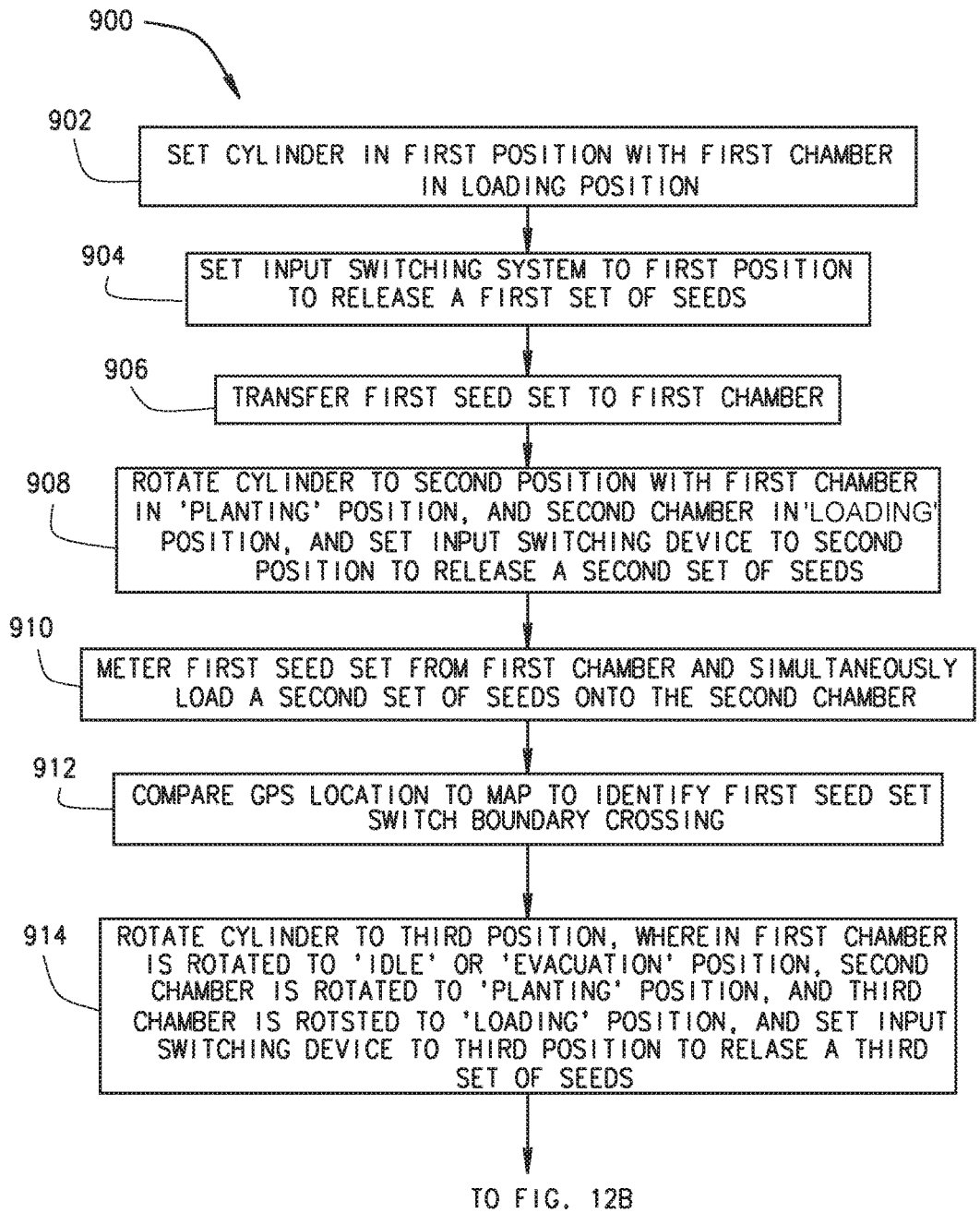
Figure 12B:
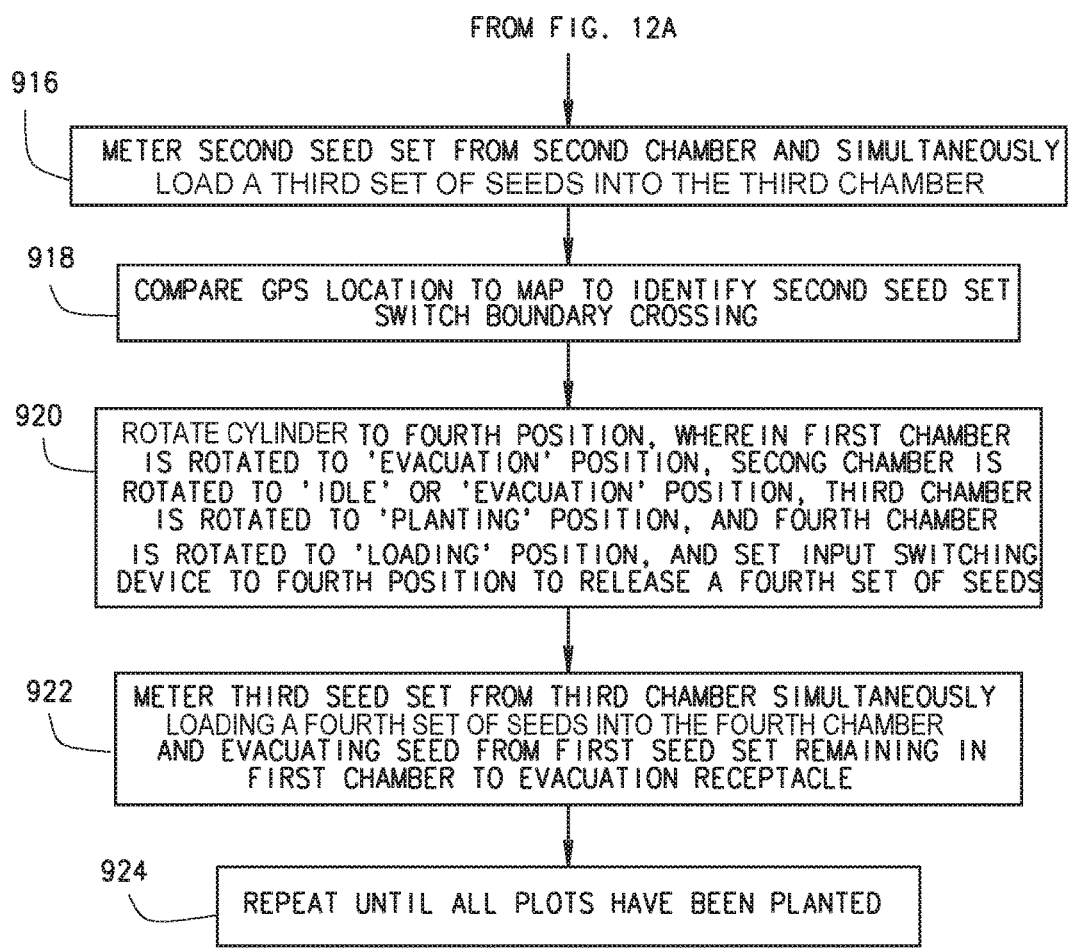
Figure 13A:
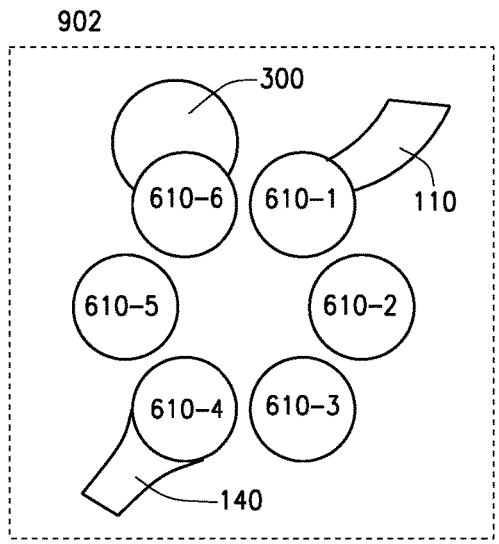
Figure 13B:
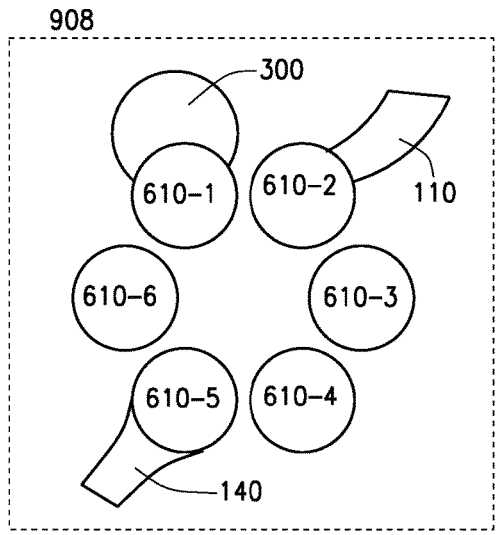
Figure 13C:
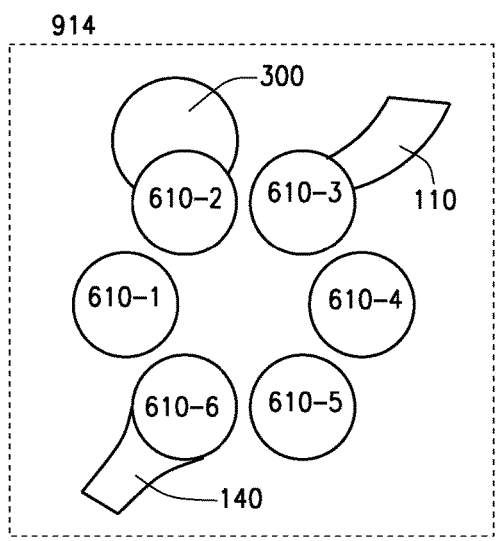
Figure 13D:
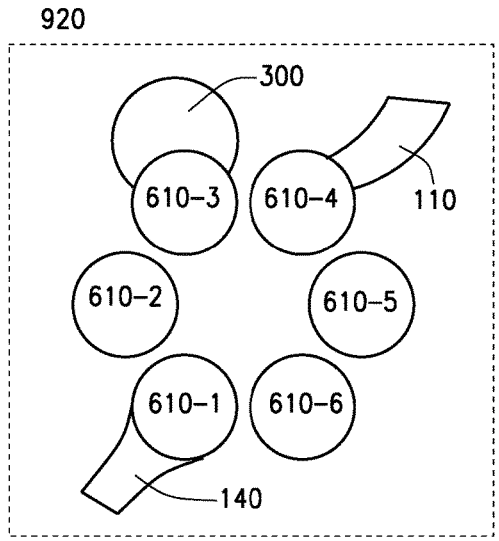

FIGS. 12A and 12B schematically illustrates a process for switching crop input varieties, in accordance with various embodiments of the present disclosure.

Figure 3:
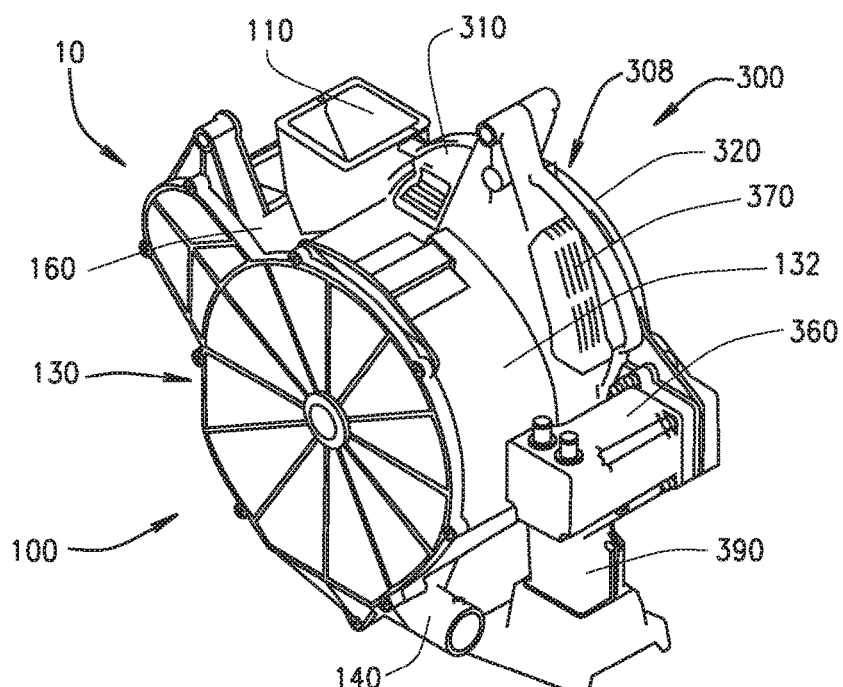
FIG. 3 is a side isometric view of the seed meter generally comprising a seed handler and a seed separator, in accordance with various embodiments of the present disclosure.

FIGS. 13A-13D schematically illustrate positions of the cylinder of the seed handler shown in FIG. 3, in accordance with various embodiments of the present disclosure.

Figure 1:
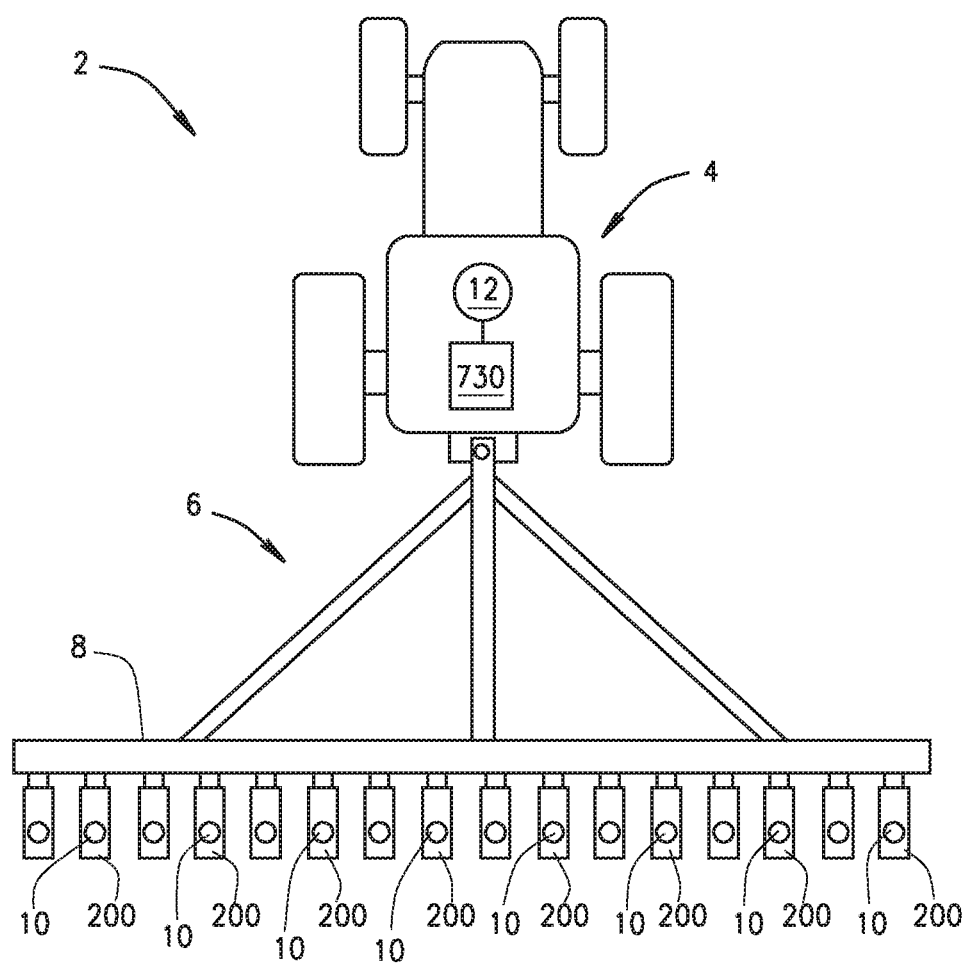
FIG. 1 is a plan view of an agricultural planting system, in accordance with various embodiments of the present disclosure.
Figure 14:
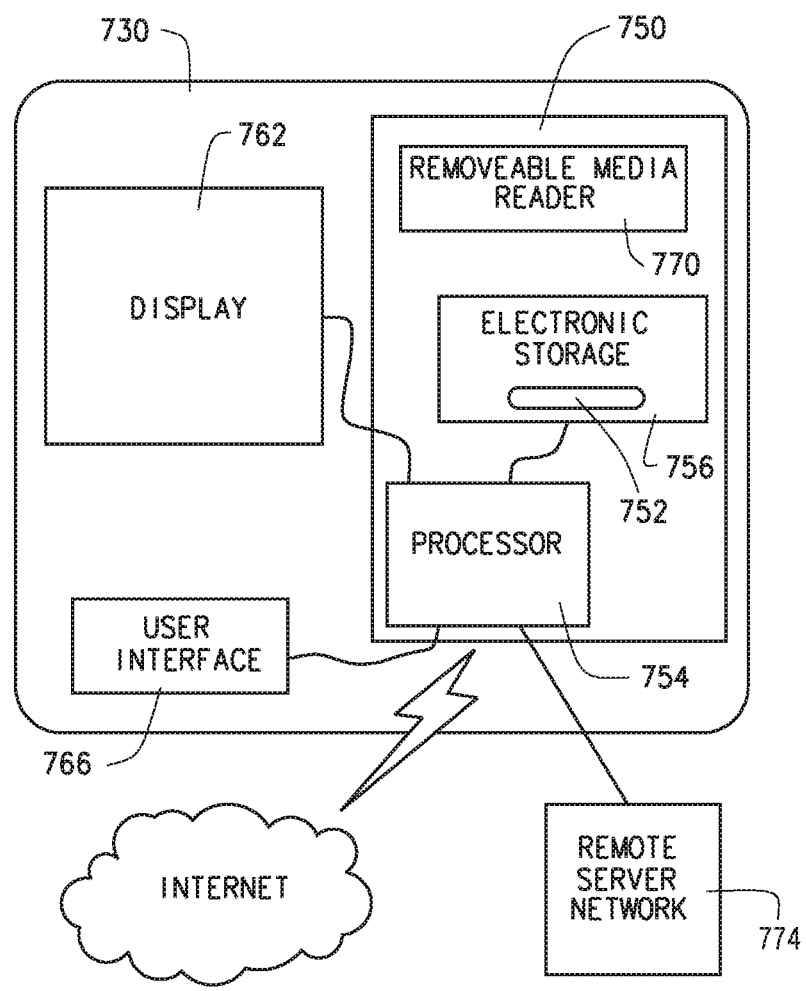

FIG. 14 is a block diagram of a monitor and control system of the agricultural planting system shown in FIG. 1, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element or layer is referred to as being "on," "engaged to or with," "connected to or with," or "coupled to or with" another element, device, object, etc., it can be directly on, engaged, connected or coupled to or with the other element, device, object, etc., or intervening elements, devices, objects, etc., can be present. In contrast, when an element is referred to as being "directly on," "directly engaged to," "directly connected to," or "directly coupled to" another element, device object, etc., there may be no intervening elements, devices, objects, etc., present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, devices, objects, sections, etc., these elements, components, regions, devices, objects, sections, etc., should not be limited by these terms. These terms may be used only to distinguish one element, component, region, device, object, section, etc., from another region, device, object, section etc., and do not necessarily imply a sequence or order unless clearly indicated by the context.

It will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and nonlimiting.

As used herein, the term computer based module can refer to, be part of, or include an application specific integrated circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

The apparatuses/systems and methods described herein can be implemented by one or more computer programs executed by one or more processors. The computer programs include processor-executable instructions that are stored on a non-transitory, tangible, computer-readable medium. The computer programs can also include stored data. Non-limiting examples of the non-transitory, tangible, computer-readable medium are nonvolatile memory, magnetic storage, and optical storage.

FIG. 1 exemplarily illustrates an agricultural planting platform 2 that generally includes a tractor 4 structured and operable to draw an agricultural implement, e.g., a planter 6, through a field or plot. The planter 6 generally comprises a toolbar 8 operatively supporting multiple row units 200 that each include, inter alia, a seed metering device 10 (referred to herein simply as the seed meter 10), in accordance with various embodiments of the present disclosure. In various implementations, the agricultural planting platform 2 can additionally include an monitor and control system 730 that includes, inter alia, a central processing unit ("CPU"), memory and graphical user interface ("GUI") (e.g., a touchscreen interface). The monitor and control system 730 can be located anywhere within the planting platform 2 described herein, for example, in various instances the monitor and control system 730 can be located in the cab of the tractor 4 and communicatively connected (e.g., wired or wirelessly) to each row unit 200, seed metering device 10 and various other sensors, systems, devices, mechanisms, devices, electronic circuits, processor based controllers, etc., of the planting platform 2. In various embodiments, the monitor and control system 730 includes the features of the planter monitor described in U.S. Pat. No. 8,386,137, U.S. patent application Ser. No. 14/421,659, now issued U.S. Pat. Nos. 9,635,659, 7,775,167, and 7,673,572), the disclosures of which are incorporated herein by reference in their entirety. In various embodiments, a global positioning system ("GPS") receiver 12 can be mounted to the tractor 4 and communicatively connected to the monitor and control system 730.

Figure 2:
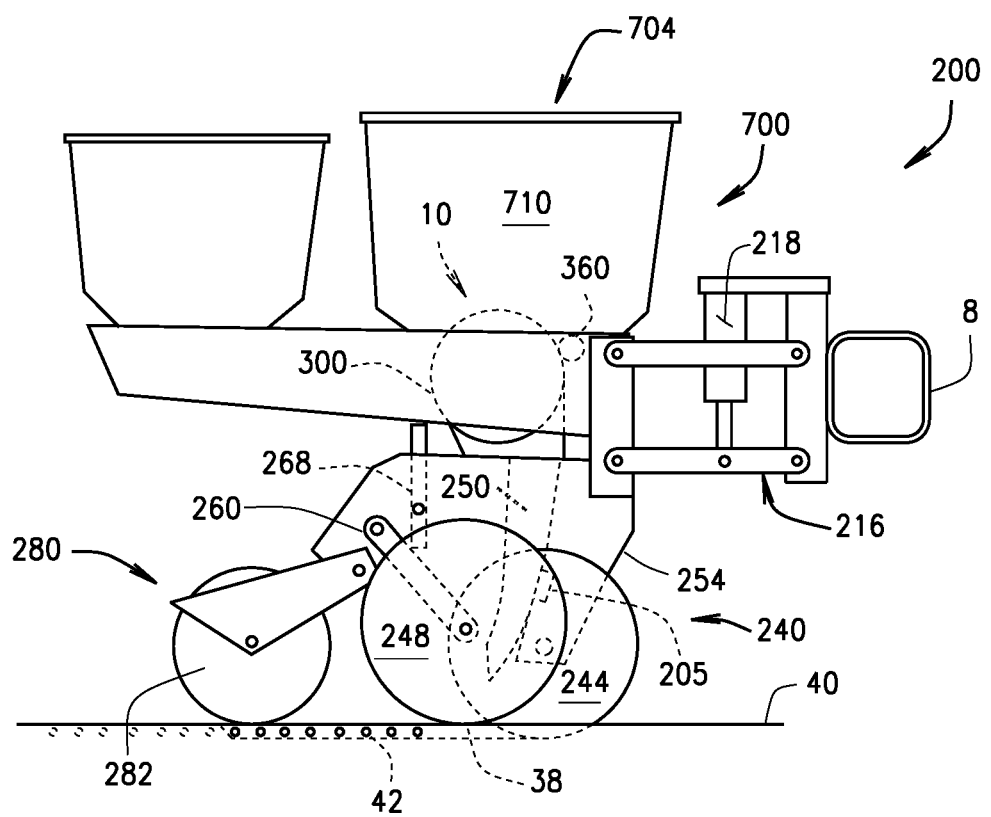
FIG. 2 is a side elevation view of an agricultural row unit of the agricultural planting system shown in FIG. 1 including a seed meter, in accordance with various embodiments of the present disclosure.

Referring now to FIG. 2, in various embodiments each row unit 200 can be a planter row unit. Each row unit 200 can be pivotally connected to the toolbar 8 by parallel linkage 216. Each row unit 200 is substantially identical in structure and functionality, therefore, for clarity and simplicity only a single row unit 200 will be described herein. The parallel linkage 216 can include an actuator 218 structured and operable to apply lift and/or downforce on the row unit 200, relative to the toolbar 8. The row unit 200 includes a furrow opening system 240 that generally includes two opening discs 244 rollingly mounted to a downwardly-extending shank 254. The opening discs 244 are structured and operable to open a V-shaped trench, or furrow, 38 in the soil 40. The row unit additionally includes a pair of gauge wheels 248 that are pivotally supported by a pair of corresponding gauge wheel arms 260. The height of the gauge wheels 248 relative to the opening discs 244 controls the depth of the trench 38. In various embodiments, a depth adjustment rocker 268 can limit the upward travel of the gauge wheel arms 260 and thus, the upward travel of the gauge wheels 248.

Referring now to FIGS. 2 and 3, each seed meter 10 generally comprises a seed handling unit 100, referred to herein simply as the seed handler 100, that is connected to and interoperable with a seed separating unit 300, referred to herein simply as the seed separator 300. In various embodiments, each seed separator 300 can be similar to that disclosed in International Patent Application No. PCT/US2012/030192. Each seed meter 10 is generally structured and operable to receive individual sets of seed (each set of seed comprising seed of particular type), meter and deposit (i.e., plant) a particular number of seeds 42 from each set into a respective trench 38 through a seed tube 250 fluidly connected to an exit chute 390 of the seed meter 10, and discard the remainder of the set that was not planted via the evacuation chamber exit nozzle 140. The seed meter 10 can receive seed from any suitable source, such as the exemplary sources described in more detail below.

Referring now to FIGS. 2, 3, 4, 5, 6 and 7, as described above, each row unit 200 of the agricultural planting platform 2 includes a respective seed meter 10. Each seed meter 10 is substantially identical in structure and function. Hence, for clarity and simplicity, the following description will refer to only a single row unit 200 and a corresponding single seed meter 10. In various embodiments, the seed meter 10 includes an electric drive separator motor 360 (e.g., a stepper motor) that is operatively connected to a seed disc 350 of the seed separator 300. In various embodiments the separator motor 360 can be a hydraulic or other drive. The motor 360 is structured and operable to rotate the seed disc 350 in a direction R (see FIGS. 4, 5 and 7) within a housing 308 of the seed separator 300 to parse a stipulated, or predetermined, number of seeds from a set of seeds deposited into the seed handler 100 and then dispense each parsed seed into the seed tube 250, as described further below. In various implementations, the row unit 200 can include a seed sensor 205 (e.g., an optical or electromagnetic sensor) mounted to or within the seed tube 250, wherein the sensor 205 is structured and operable to send light or electromagnetic waves across the path of seeds 42 to count and/or acknowledge each seed that passes through the seed tube 250. The row unit 200 further includes a closing system 280 including one or more closing wheels 282 is pivotally coupled to the row unit 200 and configured to close the trench 38 after the seed meter 10 has parsed the stipulated number of seeds and dispensed them into the seed tube 250, as described below, whereafter the seed tube 250 directs the seeds into the trench 38.

Turning now to FIGS. 2, 3, 6, 7, 8 and 9, each row unit 200 comprises a seed planting system 700 that includes a corresponding seed meter 10. As described above, the seed meter 10 comprises the seed handler 100 that is operably connected to the seed separator 300. In various embodiments, the seed handler 100 comprises a partitioned cylinder 600 rotationally disposed within a housing 132. The cylinder 600 comprises at least three (e.g., six) seed chambers 610 and is operatively connected to a cylinder motor 160 (e.g., a stepper motor) that is structured and operable to incrementally, or stepwise, rotate the cylinder 600, as described further below. Generally, the cylinder 600 can be configured to receive seed from an inlet 110 of the seed handler 100. The inlet 110 can receive seed from a seed source 704 of the seed planting system 700. The seed source 704 can be any suitable seed source capable of providing seed to the seed handler 100, via the inlet 110. For example, in various embodiments, the seed source 704 can comprise a storage unit 710 (e.g., a bulk seed hopper) mounted to the row unit 200, as exemplarily illustrated in FIG. 2. Or, alternatively, in various embodiments, the seed source 704 can be an input switching system 800 or 800', exemplarily illustrated in FIGS. 10 and 11. It is envisioned that in various embodiments, the seed source 704 can be any other suitable source of seed for depositing seeds into the seed meter 10, for example, manual input of seeds into the seed meter 10.

As also described further below, the cylinder 600 is structured and operable to present seed to the seed separator 300 for parsing as described herein, and then dispense any seed not parsed to an evacuation port 140. A vacuum impeller 740 can be in fluid communication with the evacuation port 140 for drawing seed from the evacuation port 140 to an evacuation receptacle 745. The cylinder 600 can be mechanically coupled to the cylinder motor 160 such that the cylinder motor 160 is structured and operable to selectively vary a rotational position of the cylinder 600. Both the cylinder motor 160 and the separator motor 360 can be in data communication with the monitor and control system 730. In various embodiments, the monitor and control system 730 can be configured to send position commands to the cylinder motor 160 in order to selectively change the rotational position of the cylinder 600. Additionally, the monitor and control system 730 can be configured to send rate commands to the separator motor 360 in order to selectively vary the metering rate of the seed separator 300 or to stop rotation of the seed separator 300. Furthermore, as described above, the monitor and control system 730 can be in data communication with the GPS receiver 12 for receiving geo-referenced location information from the GPS receiver 12. In various instances, the monitor and control system 730 also can be in data communication with a speed sensor 760 for receiving a signal related to the speed at which the agricultural planting platform 2 traverses the ground/soil 40. In various implementations, the speed sensor 760 can comprise a radar sensor, wheel speed sensor or any other speed sensor known in the art. The term "data communication" as used herein is intended to encompass wireless (e.g., radio-based), electrical, electronic, and other forms of digital or analog data transmission.

Additionally, in various embodiments, it is envisioned that the planter 6 and/or seed planting system 700 and/or the seed meter 10, described herein, can be part of a totally automated 'Smart' system, such as the system described in PCT Application PCT/US2015/045301, titled Apparatus And Methods For In-Field Data Collection And Sampling, filed Aug. 14, 2015, and corresponding U.S. Provisional Application 62/037,968, filed Aug. 15, 2014, the disclosure of each being incorporated by reference herein in their entirety.

Turning now to FIGS. 3, 4, 5, 6, 7 and 8, the seed handler 100 including cylinder 600 will now be described in more detail. In various embodiments, the seed handler 100 includes a main assembly 130 that generally comprises the housing 132, the cylinder 600 rotationally disposed within an internal cavity defined at least partially by the housing 132, and the inlet 110 extending from the housing 132 and fluidly connected with the internal cavity of the assembly 130. As described above, the cylinder 600 includes a plurality of seed chambers 610 (e.g., at least three seed chambers 610). Via controlled incremental rotation of the cylinder 600 (as described further below), each seed chamber 610 is structured and operable to sequentially: 1) receive a set of seeds via the inlet 110 from the seed source 704 (e.g., input switching system 800), each set of seeds comprising a selected number of seeds having one or more selected genotypic or phenotypic traits and/or selected treatment applied thereto; 2) deliver or present the received seed to the seed separator 300, whereby the seed separator parses and singulates a particular/predetermined/selected number of the seeds, and dispenses each parsed and singulated seed into the exit chute 390 of the seed separator 300; and 3) dispense any seed remaining within the respective chamber 610 after the set of seeds has been parsed and singulated to the evacuation receptacle 745.

Figure 8:
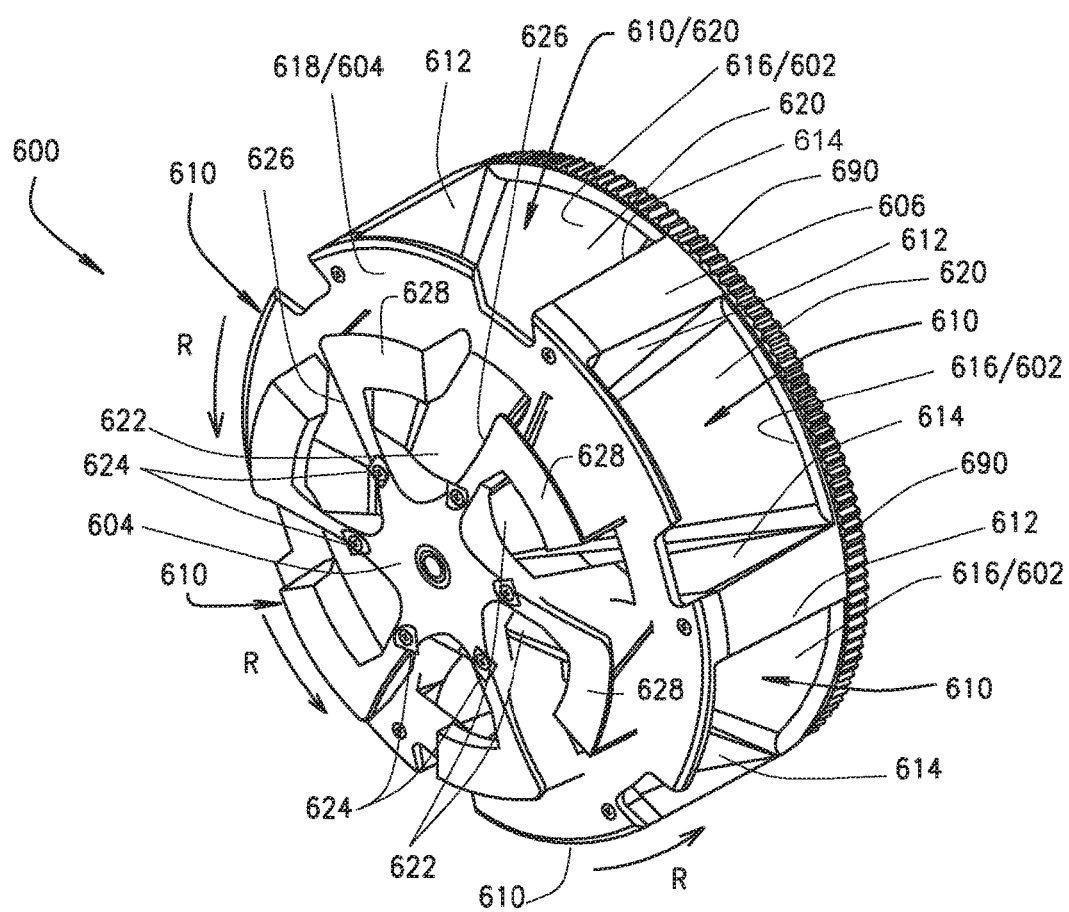
FIG. 8 is an isometric view of a cylinder of the seed handler shown in FIG. 3, in accordance with various embodiments of the present disclosure.

As best shown in FIG. 8, each chamber 610 is formed within the cylinder 600 to have a leading wall 612, a trailing wall 614, a rear wall 616 defined by a rear panel 602 of the cylinder 600, and a front wall 618 defined by a front panel 604 of the cylinder 600. Moreover, each chamber 610 is formed to define a funnel having top opening 620 provided within a cylindrical or perimeter side 606 of the cylinder 600, and a bottom opening 622 extending through the front panel 604 of the cylinder 600. As described below, in operation of the seed meter 10, each set of seeds is controllably delivered to a respective chamber 610 through the top opening 620, whereafter the seeds fall (e.g., via gravity and/or forced air) to the bottom opening 622 where the seeds are presented to the seed disc 350 of the seed separator 300 for parsing and singulation. Additionally, in various embodiments, the rear panel 602 of the cylinder 600 can be structured to define a sprocket gear 690 having a plurality of gear teeth disposed along a circumferential edge that are engageable by a drive gear operably connected to the cylinder motor 160 for controllable rotation of the cylinder 600 about a longitudinal central axis thereof. For example, in various embodiments, the drive gear can be coupled to an output shaft of the cylinder motor 160 such that gear teeth (not shown) of the drive gear are operably engaged with the gear teeth of the sprocket gear 690, whereby the cylinder motor 160 can controllably rotate the cylinder 600.

As described above, the seed handler 100 includes the motor 160 that is structured and operable to controllably incrementally rotate the cylinder 600, e.g., controllably rotate the cylinder 600 in 30° increments (or any other desired increment) (e.g., as controlled by a computer based controller of the seed meter 10 communicatively connected to the monitor and control system 730). In various embodiments, the motor 160 can comprise a stepper motor, or a rotary actuator such as a servomotor, that is structured and operable (e.g., as controlled by a computer based controller of the seed meter 10 communicatively connected to the monitor and control system 730) to rotate an output shaft through defined angular displacements (e.g., 30° displacements).

Figure 4:
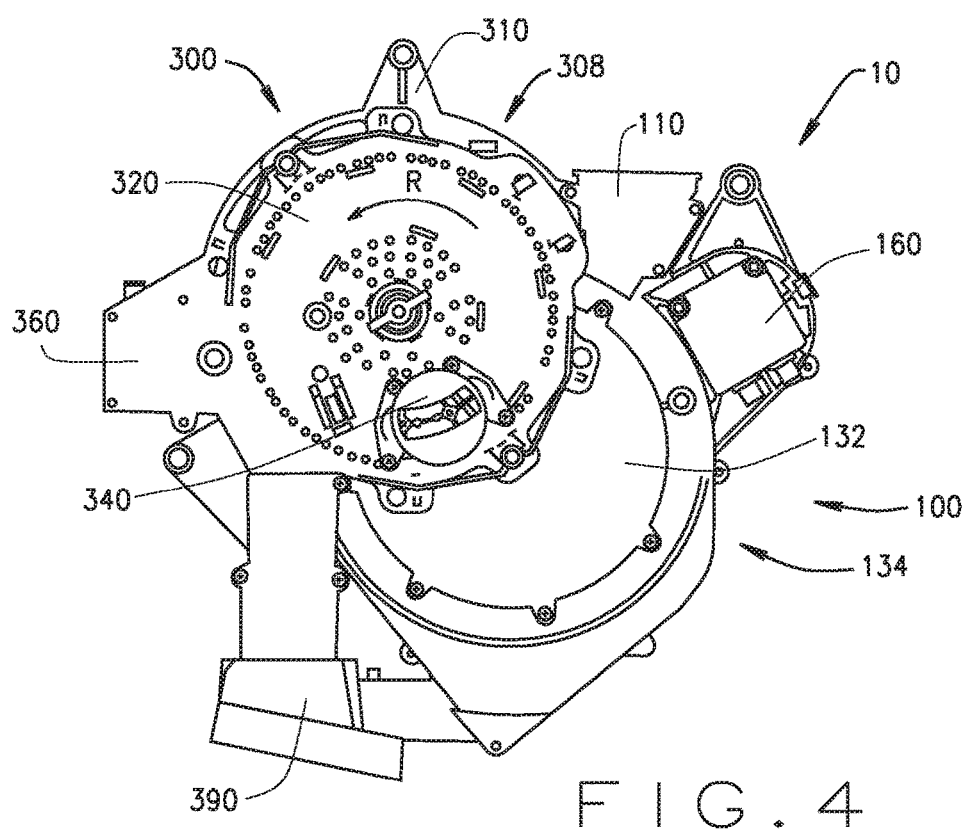
FIG. 4 is a side elevation view of the seed meter shown in FIG. 3, in accordance with various embodiments of the present disclosure.
Figure 5:
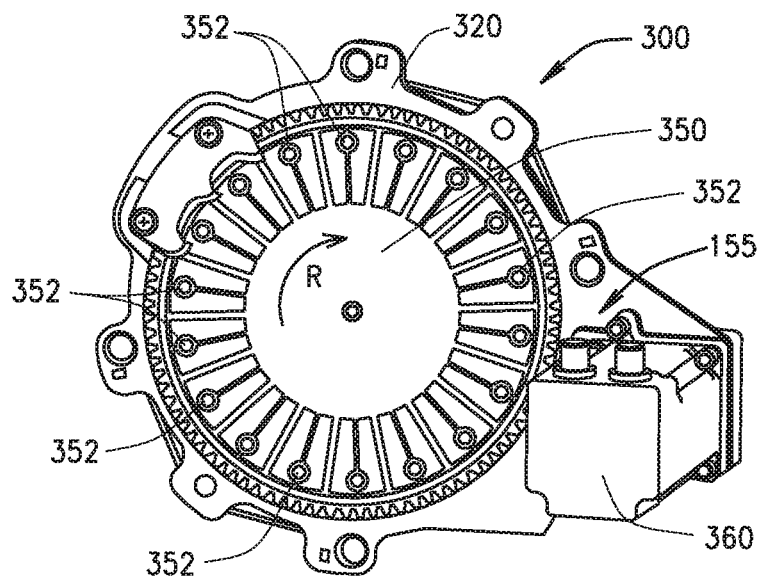
FIG. 5 is a side elevation view of the seed meter shown in FIG. 3, illustrating a seed disc of the seed separator, in accordance with various embodiments of the present disclosure.
Figure 6:
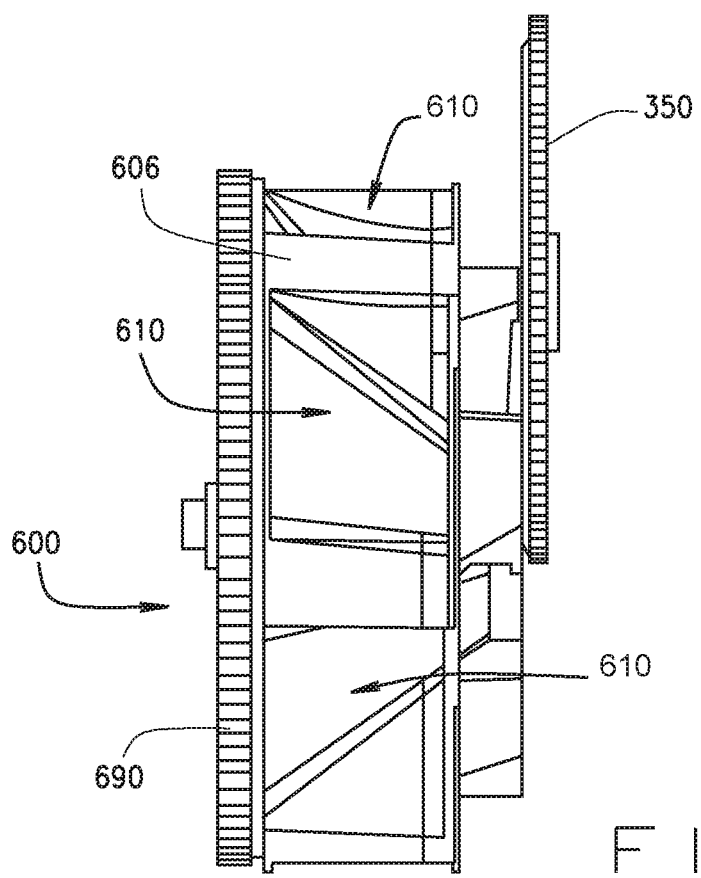
FIG. 6 is a front elevation view of the seed meter shown in FIG. 3, illustrating the seed disc and a cylinder of the seed handler, in accordance with various embodiments of the present disclosure.

Referring particularly to FIGS. 3, 4 and 5, the seed separator 300 is structured and operable to entrain seeds on seed apertures 352 of the seed disc 350 by vacuum and then release the seeds, or have the seeds dislodged, from the apertures 352 into the exit chute 390 that is formed in, or connected to, the seed-side 310 of the separator housing 300, and thus into the seed tube 250 of the respective row unit 200. The seed apertures 352 are in fluid communication with a vacuum source (not shown). In various embodiments, the seed apertures 352 are disposed on a face of the seed disc 350 and spaced along an outer edge portion of the seed disc 350 that is radially inward from the circumferential edge of the seed disc 350. In various embodiments, the seed apertures 352 extend laterally through the seed disc 350. The seed separator housing 308 generally comprises the seed side 310 housing and a vacuum-side 320, which together define an interior volume in which the seed disc 350 is rotationally disposed. A vacuum is imposed on the side of the seed disc 350 opposite the side of the seed disc 350 that is adjacent the seed handler 100 by a vacuum source (not shown) fluidly connected the vacuum-side 320 of the seed separator housing 308. In various embodiments, the vacuum can be provided through a vacuum port 340 in the separator housing vacuum-side 320 such that the vacuum generated by the vacuum source is in fluid communication with an interior volume of the housing 308. The housing 308 can include one or more vent holes 370 that is/are structured and operable to provide fluid communication with ambient air, and thereby allow the generation of the vacuum within the housing 308, and more particularly, allow the generation of the vacuum at each seed aperture 352 of the seed disc 350.

Figure 7:
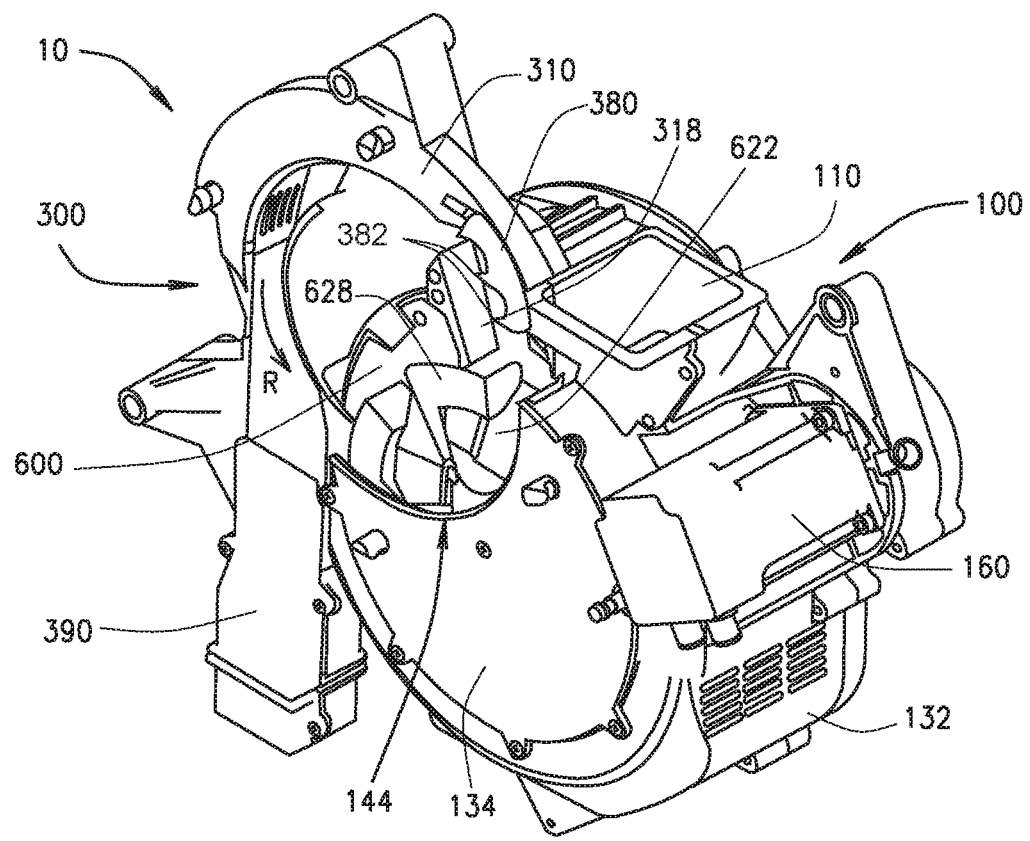
FIG. 7 is an isometric view of the seed meter having a vacuum-side of the seed separator housing and the seed disc removed, in accordance with various embodiments of the present disclosure.

Referring again to FIGS. 3, 4, 5, 6, 7 and 8, it should be appreciated that by selective incremental, or stepwise, rotation of the cylinder 600, one of the chambers 610 at a time can be sequentially placed in communication with the inlet 110 to receive seed from the seed source. FIG. 7 exemplarily illustrates the seed meter 300 having the vacuum-side 320 of the housing 308 and the seed disc 350 removed, thereby showing the seed-side interior of the seed separator 300 in combination with the seed handler 100. As exemplarily illustrated in FIGS. 5-8, incremental, or stepwise, rotation of the cylinder 600 will sequentially place each chamber 610, one-at-a-time, into a 'loading' position, then into a 'planting' position, then into an 'evacuation' position, as describe below.

When a chamber 610 is rotated to the 'loading' position, a set of seeds comprising a predetermined number of seed is deposited into the chamber 610. The sets of seeds are dispensed from seed source 704, e.g., the seed storage unit 710 or from a seed input switching system 800/800', as described below. Subsequently, when the chamber 610 filled with the set of seeds is rotated into the 'planting' position, the bottom opening 622 of the respective chamber 610 will be in fluid communication with the seed separator 300, and particularly, the set of seeds deposited in the respective chamber 610 will be in fluid communication with the seed disc 350. More specifically, when a particular chamber 610 is rotated from the 'loading' position into the 'planting' position, the seed disposed within the respective chamber 610 slides (e.g., by gravity and/or forced air) into contact with the seed disc 350 through the chamber bottom opening 622. As illustrated in FIG. 7, a disc-side 134 of the seed handler housing 132 includes an extraction window 144 that exposes at least the chamber 610 rotated into the 'planting' position. As illustrated in FIGS. 4 and 7 the seed separator 300 is connected to the seed handler 100 so that a portion of the seed disc 350 is disposed within the evacuation window 144. Accordingly, when a chamber 610 is rotated into the 'planting' position, the seed deposited within the respective chamber 610 will be in fluid communication with the seed disc 350, moreover at least one of the seeds will be in direct contact with the seed disc 350.

Once a chamber 610 has been rotated into the 'planting' position, rotation of the seed disc 350 and the vacuum generated at each seed aperture 352 will parse and remove seed from the chamber 610 as each seed aperture 352 is rotated through the evacuation window 144 and past the bottom opening 622 of the chamber 610. Further rotation of the seed disc 650 will carry the parsed seed along a circular seed path and deposit the parsed seed into the exit chute 390. Particularly, as each seed aperture 352 passes the bottom opening 622 of the chamber 610 the vacuum at each such seed aperture 352 will draw at least one seed from the chamber 610 into contact with seed disc 350 and entrain the seed(s) on the seed disc 350 at the respective seed aperture 352, whereafter each entrained seed will be carried along the circular seed path and deposited into the exit chute 390.

Occasionally, as the seed disc rotates and seeds are entrained on each seed aperture 352, an entrained seed can lift a second seed from the set of seeds in the respective chamber 610 such that the second seed is 'stacked' on top of the entrained seed, separated from the seed in the chamber 610, and carried along with the seed path with the entrained seed. However, after being entrained on the seed apertures 352, the parsed or entrained seed will travel along the circular seed path past at least one of a plurality of pre-singulators 624 that are connected to the cylinder front panel 604. The pre-singulators 624 are structured to have a curvature such that a portion of each pre-singulator 624 extends laterally away from the cylinder front panel 604. Each pre-singulator 624 is connected to the cylinder front panel 604 at a location adjacent a trailing edge 626 of the bottom opening 622 of each chamber 610 such that at least the curved portion of each pre-singulator 624 that extends laterally away from the cylinder front panel 604 is positioned in close proximity the front face of the disc 350 (i.e., the face of the seed disc 350 to which the seeds are entrained), and moreover in close proximity to the circular path of the apertures 352, and hence the circular path of the entrained seeds. Importantly, as any 'stacked' seed that is lifted, or carried, and removed from the respective set of seeds by an entrained seed out of the set of seeds in the chamber 610, either the 'stacked' seed and/or the entrained seed will contact a pre-singulator 624 at the trailing edge 626 of the respective bottom opening 622 and thereby dislodge, or 'knock off', the stacked seed and fall back into the respective chamber 610, i.e., back into the chamber 610 in the 'planting' position, whereafter the dislodged seed will once again be presented to the seed disc 350 for parsing and planting.

Additionally, in various instances, multiple seeds (i.e., two or more seeds) can be entrained by the vacuum at a single seed aperture 352 as the seed aperture 352 is rotated through the evacuation window 144 and past the bottom opening 622 of the chamber 610 in the 'planting' position. In such instances, the respective pre-singulator 624 disposed adjacent the trailing edge 626 for the respective bottom opening 622 may dislodge any additional seed (i.e., any seeds in excess of one), however, in various instances, the vacuum force may prevent the additional seeds from being dislodged by the respective pre-singulator 624. To account for such instances, the seed separator 300 includes a singulator 380 (FIG. 7) that comprises one or more singulating teeth 382. Although the singulator 380 is shown in FIG. 7 as possibly being connected to the seed-side housing 310, the illustration of the singulator 380 in FIG. 7 is to merely illustrate the location of the singulator 380 within the seed separator 300. More specifically, the singulator 380 can be mounted to either the seed-side housing 310 or the vacuum-side housing 320, or any other location within the seed separator 300 such that the singulator 380 is positioned to dislodge multiple entrained seeds as described herein. The singulator 380 is disposed within the housing 308 such that the singulating teeth 382 are positioned in close proximity to the face of the seed disc 350, and moreover in close proximity to the circular path of the apertures 352, and hence the circular path of the entrained seeds. However, the singulator 380 is disposed further away from the bottom opening 622 the chamber 610 in the 'planting' position, and further along the seed path from where the seeds are entrained than the pre-singulators 624. The singulator 380 is structured and operable to remove seeds in excess of one entrained on any aperture 352. More specifically, as any 'multiple' seed is entrained by an aperture 352 and carried out of the set of seeds in the chamber 610, if the 'multiple' seed is not dislodged by the respective pre-singulator 624, the 'multiple' seed will travel further along the seed path, contact at least one of the singulator teeth 382 and be dislodged from the respective aperture 352 such that only one seed remains entrained on each respective aperture 352.

Additionally, in various embodiments, the cylinder 600 can be structured to include a plurality of singulator bins 628 connected to, or integrally formed within, the front panel 604 of the cylinder 600. Each singulator bin 628 is disposed above, i.e., radially outward from, a respective one of the seed chamber bottom openings 622. In various instances, the singulator bins 628 are structured and operable to catch the multiple entrained seeds that are dislodged by the singulator 380. More specifically, the singulator 380 is disposed radially outward from the singulator bins 628 (i.e., the singulator bins 628 are disposed radially inward from the singulator) such that, in various instances, when any 'multiple' seed(s) is/are dislodged from entrainment on an aperture 352 by the singulator 380, the dislodged seed(s) will fall into either the singulator bin 628 disposed below the singulator 380 and above the bottom opening 622 of the chamber 610 from which the seeds are being parsed, i.e., the chamber 610 in the 'planting' position, or back into the respective chamber 610 in the 'Planting' position so that the respective seed can subsequently be parsed and planted. Hence, in such instances, the singulator bins 628 are structured and operable to receive seeds that are dislodged by the singulator 380, i.e., seeds in excess of one that are entrained on any seed aperture 352 and dislodged by the singulator 380. Thereafter, as the respective chamber 610 and corresponding singulator bin 628 are rotated from the 'planting' position to an 'evacuation' position (described further below), any seeds in the singulator bin 628 will be evacuated to the evacuation receptacle 745.

Additionally, in various instances, the singulator bins 628 are structured and operable to catch seed that is/are 'wiped' from the seed apertures 352 by the trailing edge 626 of the respective chamber 610, also referred to herein as the wiper 626. More specifically, as described herein, the seed separator 300 operates to parse a specified number of seeds from each respective seed set. However, in various instances the seed disc 350 does not stop rotating between the incremental rotations of the cylinder 600. Hence, after the desired number of seeds have been parsed from a seed set, and prior to the incremental rotation of the cylinder 600, additional seeds (i.e., seeds in excess of the specified number to be parsed and planted) may be parsed from the set of seeds in the respective chamber 610. Specifically, after the desired number of seeds have been parsed from a chamber 610 and as the cylinder 600 is being incrementally rotated to position a subsequent chamber in the 'Planting' position, the seed disc 350 may continue to parse seeds from the chamber 610 being rotated out of the 'Planting' position. However, in such instances, the incremental rotation of the cylinder 600 will cause the wiper 626 of the chamber 610 being rotated out of the 'Planting' position to contact the additional parsed seed(s) and dislodge them from the seed disc 350, so that the seeds will not be planted. The seed(s) dislodged from the seed disc 350 by will fall (e.g., by gravity and/or forced air) either into one of the singulator bins 628 or back into the chamber 610 from which they were parsed, and then subsequently be evacuated from the system 700.

Furthermore, in various embodiments, the seed separator 300 can include a deflector 318 disposed within the separator housing 308 adjacent the singulator 380 and above the singulator bin 628 of the chamber 610 in the 'planting' position. (i.e., radially outward from the 'planting' position singulator bin 628). The deflector is generally a flat strip, plate or bar structured and operable to deflect or guide seeds dislodged by the singulator 380 into either the chamber 610 in the 'planting' position or the corresponding singulator bin 628. In various embodiments, the deflector 318 can be fabrication of a resilient flexible material such that seeds dislodged by the singulator 380 cannot become lodged between a distal end of the deflector 318 and a trailing edge of one of the singulator bins 628 when the cylinder 600 is incrementally rotated, as described herein.

After a stipulated number of seeds have been parsed (e.g., a number of seeds stipulated by input to, or from a table stored in memory of, the monitor and control system 730), removed from the chamber 610 and deposited into the exit chute 390 while the respective chamber 610 is in the 'planting' position, the chamber 610 will be rotated to an 'evacuation' position wherein the bottom opening 622 is aligned with the evacuation port 140. Thereafter, any seed remaining in the chamber 610 will be removed by vacuum and/or gravity and/or forced air from the chamber 610 and transported to the evacuation receptacle 745 that is in fluid communication with the evacuation port 140. Movement of a chamber 610 from the 'planting' position to the 'evacuation' position can be accomplished by one or more incremental rotations of the cylinder 600. For example, in various implementations, each incremental rotation comprise a 30° rotation of the cylinder 600, and movement of a chamber 610 from the 'planting' position to the 'evacuation' position involves four to eight 30° incremental rotations, e.g., six 30° incremental rotations.

Notably, it is envisioned that in various embodiments, the seed meter 10 can be structured and operable such that any position other than the 'Loading' and 'Planting' can be an 'Evacuation' position wherein seeds that have not been parse and planted are evacuated, or transported, to the evacuation receptacle 745.

Referring now to FIGS. 9 and 10, in various embodiments, in addition to, or as an alternative to, the seed storage unit 710, the seed planting system 700 can comprise an input switching system 800, illustrated in FIGS. 9 and 10 as input switching system. In such embodiments, the seed storage unit 700 of each row unit 200 can include a respective input switching system 800, each of which are identical in structure and function. Hence, for clarity and simplicity, the following description will refer to only a single input switching system 800. The input switching system 800 generally includes an indexer 810 having a plurality of seed storage units 812. The storage units 812 can comprise seed chambers, hoppers or seed packages. A solenoid-operated switch 814 can be in data communication with the monitor and control system 730 for receiving position commands from the monitor and control system 730. Each discrete position of the solenoid-operated switch 814 can place one of the seed storage units 812 in communication with an indexer outlet 816 such that seed from the seed storage units 812 is transferred (e.g., by gravity and/or forced air) to the indexer outlet 816. Seed introduced to the indexer outlet 816 can be transferred (e.g., by gravity and/or forced air) into the inlet 110 of the respective seed handler 100 of the respective seed meter 10.

FIG. 11 exemplarily illustrates an alternative embodiment of the input switching system 800, illustrated as 800'. In such embodiments, the input switching system 800' can include a bulk fill system 820 including a plurality of bulk hoppers 822 that can be supported by the toolbar 8. Seed can flow (e.g., by gravity and/or forced air) into an entrainer 826 having a plurality of outlets. Each outlet can distribute seed from one of the bulk hoppers 822 to a seed line 827. A blower 824 can be in fluid communication with the entrainer 826 for entraining seeds into the seed lines 827. The seed lines 827 can be in communication with a valve 828 (e.g., a solenoid-operated valve) configured to place one of the seed lines at a time in communication with the inlet 110. The monitor and control system 730 can be in data communication with the valve 828 and can send position commands to the valve 828, each position command corresponding to a configuration in which one of the seed lines 870 is in fluid communication with the inlet 110.

Turning to FIGS. 12A, 12B, 13A, 13B, 13C and 13D, an exemplary process 900 for selecting crop input varieties utilizing the input switching system 800 or 800' is illustrated. Throughout the description of process 900 herein, steps in which the cylinder 600 rotates to a new position can be carried out by the transmission of a rotation command signal from the monitor and control system 730 to the cylinder motor 160. In response to the rotation command signal, the cylinder motor 160 can incrementally rotate the cylinder 600 through a defined angle, e.g., 30° to 60°. For example, in various embodiments, in response to a predefined rotation command signal the cylinder motor 160 can repeatedly rotate the cylinder 600 30 degrees in the direction R. Moreover, steps in which a position of the input switching system 800 is modified to release a specified seed type, such steps can be accomplished by the transmission of a command signal from the monitor and control system 730 to the input switching system 800 (e.g., to the solenoid-operated valve 828 of the input switching system 800' or the solenoid-operated switch 814 of the input switching system 800) to place a storage unit or hopper in fluid communication with the inlet 110. Throughout the process 900, the monitor and control system 730 can command the separator motor 360 to drive the seed disc 350 either at a constant rate or at a rate determined by comparing the GPS-reported position of the agricultural planting platform 10 to a variable rate prescription map.

As indicated a 902, the cylinder 600 can be set in a first position (illustrated schematically in FIG. 13A) with a first one of the chambers 610 (identified as first chamber 610-1 in FIGS. 13A-13D) in a 'loading' position wherein the first chamber 610-1 is in fluid communication with the input 110 for receiving seed from the input switching device 800 or 800'. As indicated at 904, the input switching device 800/800' can be set in a first position in which a set of first seeds is released into the inlet 110, (the set of first seeds comprising a selected number of seeds having one or more selected genotypic or phenotypic traits and/or selected treatment applied thereto). Thereafter, as indicated at 906, with the first chamber 610-1 in the 'loading' position, the set of first seeds is deposited (e.g., by gravity and/or forced air) into the first chamber 610-1.

Subsequently, as indicated at 908, the cylinder 600 is incrementally rotated to a second position (illustrated schematically in FIG. 13B) in which the first chamber 610-1 is rotated to the 'planting' position (i.e., in seed communication with the seed separator 300). This rotation positions a subsequent or second chamber (identified as second chamber 610-2 in FIGS. 13A-13D) in the 'loading' position. The angular rotation of the cylinder from the first position to the second position is dependent on the number of chambers 610 within the cylinder 600. For example, in various embodiments, the cylinder 600 can comprise six chambers 610, in which case the angular rotation of the cylinder from the first position to the second, and from the second to a third position (described below) will be 60°. Additionally, in various embodiments, the angular rotation of the cylinder 600 from the first position to the second position can comprise one or more incremental rotations of the cylinder 600. For example, in various embodiments, wherein the cylinder 600 comprises six chambers 610, the cylinder 600 can be incrementally rotated 30° twice to move any one of the chambers 610 from the 'loading' position to the 'planting' position, and from the 'planting' position to an 'evacuation' position (described below). Prior to or simultaneously with the cylinder 600 being rotated to the second position, the input switching device 800/800' is set to a second position for releasing a second set of seeds (the second set of seeds comprising a selected number of seeds having one or more selected genotypic or phenotypic traits and/or selected treatment applied thereto).

As indicated at 910, when the first chamber 610-1 is in the 'planting' position, the seed separator 300 will parse seed of the first seed set from the first chamber 610-1 and dispense the parsed seed for planting, via seed tube 250, as described above. Importantly, substantially simultaneously with the seeds being parsed and/or dispensed from the first chamber 610-1 (i.e., during the time the seed in the first chamber 610-1 is being parsed and/or dispensed into the seed tube 250), the seed meter 10 and input switching device 800/800' operate to dispose the second set of seeds into the second chamber 610-2, via the inlet 110.

As indicated at 912, in various embodiments in which the seed type is varied automatically, the monitor and control system 730 can compare a GPS-reported location to a variety prescription map stored in memory of the monitor and control system 730 in order to identify a first seed type switch boundary crossing, i.e., to identify that the agricultural planting platform 2 has crossed a boundary into a region in which the first seed type is not to be planted. It should be appreciated that this region can comprise a region in which another seed type is to be planted or a gap (e.g., an alleyway) in which no seed is to be planted. In various embodiments in which the seed type is varied based on an operator input, the operator can enter a command to the monitor and control system 730 at step 912 indicating that a second seed type is to be planted.

As indicated at 914, once the first seed type switch boundary crossing has been identified, the cylinder 600 can be rotated to a third position (illustrated schematically in FIG. 13C) in which the first chamber 610-1 is in an 'idle' or 'pre-evacuation' position, wherein any seed retained with the first chamber 610-1 is idle and not acted upon, i.e., the seed temporarily remains within the first chamber 610-1. Additionally, the second chamber 610-2 is rotated to the 'planting' position, and a third chamber 610-3 is moved to the 'loading' position. Prior to or simultaneously with the cylinder 600 being rotated to the third position, the input switching device 800/800' is set to a third position for releasing a third set of seeds (the third set of seeds comprising a selected number of seeds having one or more selected genotypic or phenotypic traits and/or selected treatment applied thereto).

As indicated at 916, when the second chamber 610-2 is in the 'planting' position, the seed separator 300 will parse seed of the second seed set from the second chamber 610-2 and dispense the parsed seed for planting, via seed tube 250, as described above. Importantly, substantially simultaneously with the seeds being parsed and dispensed from the second chamber 610-2 (i.e., during the time the seed in the second chamber 610-2 is being parsed and dispensed into the seed tube 250), the seed meter 10 and input switching device 800/800' operate to dispose the third set of seeds into the third chamber 610-3, via the inlet 110.

Alternatively, in various instances, when the cylinder 600 is rotated to the third position, the first chamber 610-1 can be rotated to the 'evacuation' position, wherein the seed remaining in the first chamber 610-1 is evacuated to the evacuation receptacle 745 through the evacuation line 140, via gravity and/or vacuum and/or forced air.

As indicated at 918, in the various embodiments in which the seed type is varied automatically, the monitor and control system 730 can compare a GPS-reported location to the variety prescription map stored in memory of the monitor and control system 730 and identify a second seed type switch boundary crossing, i.e., identify that the agricultural planting platform 2 has crossed a second boundary into a region in which the second seed type is not to be planted. It should be appreciated that this region can comprise a region in which another seed type is to be planted or a gap (e.g., an alleyway) in which no seed is to be planted. In various embodiments in which the seed type is varied based on an operator input, the operator can enter a command to the monitor and control system 730 at step 912 indicating that a third seed type is to be planted.

As indicated at 920, once the second seed type switch boundary crossing has been identified, the cylinder 600 can be rotated to a fourth position (illustrated schematically in FIG. 13D) in which the first chamber 610-1 is rotated to the 'evacuation' position, the second chamber 610-2 is moved to the 'idle' or 'pre-evacuation' position, the third chamber 610-3 is rotated to the 'planting' position, and a fourth chamber 610-4 is moved to the 'loading' position. Prior to or simultaneously with the cylinder 600 being rotated to the fourth position, the input switching device 800/800' is set to a fourth position for releasing a fourth set of seeds. It should be noted that in embodiments wherein the cylinder 600 has only three chambers 610, when the cylinder 600 is rotated to the fourth position, the first chamber 610-1 will be returned to the 'loading' position to receive the fourth set of seeds (the fourth set of seeds comprising a selected number of seeds having one or more selected genotypic or phenotypic traits and/or selected treatment applied thereto).

As indicated at 922, when the third chamber 610-3 is in the 'planting' position, the seed separator 300 will parse seed of the third seed set from the third chamber 610-3 and dispense the parsed seed for planting, via seed tube 250, as described above. Importantly, substantially simultaneously with the seeds being parsed and dispensed from the third chamber 610-3 (i.e., during the time the seed in the third chamber 610-3 is being parsed and dispensed into the seed tube 250), the seed meter 10 and input switching device 800/800' operate to dispose the fourth set of seeds into the fourth chamber 610-4, via the inlet 110. Moreover, substantially simultaneously with the seeds being parsed and dispensed from the third chamber 610-3 and the seed meter 10 and input switching device 800/800' operating to dispose the fourth set of seeds into the fourth chamber 610-4, the seed remaining in the first chamber 610-1 is evacuated to the evacuation receptacle 745 through the evacuation line 140, via gravity and/or vacuum and/or forced air.

As indicated at 924, the seed meter 10 repeats the process of substantially simultaneously depositing seed sets into a chamber 610 positioned in the 'loading' position, parsing and dispensing seed from another chamber 610 positioned in the 'planting' position, and evacuating unused seed (i.e., seed not parsed and dispensed for planting) to the evacuation receptacle 745, until all plots desired to be planted have been planted.

In various embodiments, as each chamber 610 is incrementally rotated from the 'Planting' position, to the 'Idle' or 'Evacuation' position, the wiper 626 of the respective chamber will wipe from the seed disc 350 any seed that has been parsed in excess of the number of seeds specified to be parsed. For example, in various embodiments, the cylinder 600 can incrementally rotate each chamber 610 to 'Wipe' position between the 'Planting' position to the 'Idle' or 'Evacuation' position. For example, in various instances, the angular difference between the 'Planting' position and the 'Idle' or 'Evacuation' position is 60°. Accordingly, in such embodiments, each incremental rotation of the cylinder 600, e.g., the incremental rotation from the 'Planting' position to the 'Idle' or 'Evacuation' position, will comprise 60° of rotation of the cylinder 600. However, in various instances of such embodiments, each incremental rotation of the cylinder 600 can be 30° of rotation, such that when rotating from the 'Planting' position to the 'Idle' or 'Evacuation' position, the respective chamber 610 will be rotated to a 'Wipe' position wherein the wiper 626 is position such that it wipes, knocks or otherwise dislodges any seed parsed from the respective chamber 610 that is in access of the specified number of seeds to be parsed and planted from the respective chamber 610. Thereafter, the cylinder 600 would be rotated another 30° to fully rotate the respective chamber from the 'Planting' position to the 'Idle' or 'Evacuation' position. Accordingly, no excess seeds from a respective seed set will be planted, i.e., only the specified number of seeds from each seed set will be planted.

In various embodiments the seed type can be varied automatically, by comparing, via the monitor and control system 730, an empirically determined switch delay time (e.g., the time required to rotate the cylinder 600 between positions, e.g., between the first and second positions) to an estimated time between switch boundary crossings (determined, e.g., based on the agricultural planting platform 2 speed and distance from the agricultural planting platform 2 to the next region in which a subsequent seed type is to be planted). It should be appreciated that this step can be carried out where there is a gap (e.g., an unplanted alley) between seed types to be planted.

In a single-variety planting mode, the seed meter 10 can receive seed from seed storage unit 710 configured as a bulk seed hopper. In such embodiments, each chamber 610 is filled with sets of seed of the same type from the seed storage unit 710 as each respective chamber is rotated to the 'loading' position. Thus, the seed handler 100 is capable of operation in both the seed handling modes described above with respect to the process 900 and the single-variety planting mode without modification.

In some embodiments of the seed planting system 700 can be structured and operable to implement a hill plot mode, for planting seeds in a plot that is disposed on the side of a hill. For example, as illustrated in FIG. 9, in various embodiments, the seed planting system can comprise a hill plot switch and diverter 740 (e.g., a solenoid-operated valve) is disposed between the input switching system 800/800' and the inlet 110 for selectively diverting seed directly to the seed tube 250 rather than permitting seed to enter the inlet 110. The hill plot switch and diverter 740 can be in data communication with the monitor and control system 730 for receiving position switch commands from the monitor and control system 730. In operation, when the monitor and control system 730 sends a position switch command to the hill plot switch and diverter 740, seed is diverted from the input switching system 800 directly to the seed tube 250, bypassing the seed meter 10, and deposited into the furrow 38. It should be appreciated that such embodiments can be particularly useful in planting hill plots, e.g., releasing a batch of seeds substantially simultaneously into the seed tube 250 for planting in a single location. In various embodiments, the batch of seeds substantially simultaneously released can comprise 2, 3, 4, 5, 6, 7, 8, 9, 10 or more seeds. It is envisioned that the hill plot switch and diverter 740 can be located anywhere within the seed planting system 700 that is suitable to divert seed from any respective seed input described herein to the seed tube 250 rather than permitting seed to enter the inlet 110.

Alternatively, it is envisioned that in various hill plot embodiments, the seed meter 10 can be structured and operable such that the seed disc 350 and cylinder 600 can be operated to parse a plurality of seeds from one or more chamber 610 in a manner that will put the seeds in a very close proximity to one another as they are discharged from the seed tube 250 in order to create a "hill plot". For example, in various instances, the rotational speed of the seed disc 350 can be increased to deposit seeds in the seed tube at a faster rate and hence, plant the seeds closer together. Or, alternatively, in various instances, the planting system 700 can include a hill plot switch and gate 740' disposed within the seed tube 250, or between the seed disc 350 and the seed tube 250, wherein the hill plot switch and gate 740' is operable to selectively (e.g., as controlled by the monitor and control system 730) open and close. For example, when the hill plot switch and gate 740' is in a Closed position, seeds parsed by the seed disc 350 are accumulated at the hill plot switch and gate 740', then when the hill plot switch and gate 740' is moved to an Open position, the accumulated seeds drop into the seed tube 250 as a group and are planted close together.

Referring now to FIG. 14, as described above, the agricultural planting platform 2, seed planting system 700 and/or the seed meter 10 is/are controlled by the monitor and control system 730, more particularly, by execution of various seed planting system software, programs, algorithms, and/or code 752 executed by at least one processor of the monitor and control system 730. In various embodiments, the monitor and control system 730 includes various computers, controllers, programmable circuitry, electrical modules, etc. that can be located at various locations of the agricultural planting platform 2, the seed planting system 700 and/or the seed meter 10. Particularly, in various embodiments, the monitor and control system 730 is a computer based system that can include one or more computers and/or computer based modules 750 that each include at least one processor 754 suitable to execute the various software, programs, algorithms, and/or code that control all automated functions and operations of the agricultural planting platform 2, the seed planting system 700 and/or the seed meter 10, as described herein. Each computers and/or computer based module 750 can additionally include at least one electronic storage device 758 that comprises a computer readable medium, e.g., non-transitory, tangible, computer-readable medium, such as a hard drive, erasable programmable read-only memory (EPROM), electronically erasable programmable read-only memory (EEPROM), read-write memory (RWM), etc. Other, non-limiting examples of the non-transitory, tangible, computer-readable medium are nonvolatile memory, magnetic storage, and optical storage. Generally, the computer readable memory be any electronic data storage device for storing such things as the various software, programs, algorithms, code, digital information, data, look-up tables, spreadsheets and/or databases, etc., used and executed during operation of the agricultural planting platform 2, the seed planting system 700 and/or the seed meter 10, as described herein.

Furthermore, in various implementations, the monitor and control system 730 can include at least one display 762 for displaying such things as information, data and/or graphical representations, and at least one user interface device 766, such as a keyboard, mouse, stylus, and/or an interactive touch-screen on the display 766. In various embodiments, some or all of the computers and/or computer based modules 750 can include a removable media reader 770 for reading information and data from and/or writing information and data to removable electronic storage media such as floppy disks, compact disks, DVD disks, zip disks, flash drives or any other computer readable removable and portable electronic storage media. In various embodiments the removable media reader 770 can be an I/O port of the respective computer or computer based module 750 utilized to read external or peripheral memory devices such as flash drives or external hard drives.

In various embodiments, the monitor and control system 730, e.g., one or more of the computers and/or computer based modules 750, can be communicatively connectable to a remote server network 774, e.g., a local area network (LAN), via a wired or wireless link. Accordingly, the monitor and control system 730 can communicate with the remote server network 774 to upload and/or download data, information, algorithms, software programs, and/or receive operational commands. Additionally, in various embodiments, the monitor and control system 730 can be structured and operable to access the Internet to upload and/or download data, information, algorithms, software programs, etc., to and from Internet sites and network servers. In various embodiments, the various seed planting system software, programs, algorithms, and/or code executed by the processor(s) 754 to control the operations of the agricultural planting platform 2, the seed planting system 700 and/or the seed meter 10 can be top-level system control software that not only controls the discrete hardware functionality of the agricultural planting platform 2, the seed planting system 700 and/or the seed meter 10, but also prompts an operator for various inputs.

The foregoing description is presented to enable one of ordinary skill in the art to make and use the invention and is provided in the context of a patent application and its requirements. Various modifications to the various embodiments of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

What is claimed is:

1. A seed meter, said seed meter comprising:
   a seed handler, the seed handler comprising a cylinder, the cylinder comprising a plurality of seed chambers, the seed handler structured and operable to incrementally rotate the cylinder to sequentially position each seed chamber in a 'loading' position wherein each seed chamber receives a sets of seeds, sequentially position each seed chamber in a 'planting' position wherein a particular number of seeds from each seed set are parsed from each seed chamber and transported to an exit chute for planting, and sequentially position each seed chamber in an 'evacuation' position wherein any seeds remaining in each chamber after parsing are evacuated from each chamber; and
   a seed separator operably coupled to the seed handler, the seed separator structured and operable to parse a particular numbers of seed from each seed chamber and transport the seed to the exit chute as each seed chamber is incrementally rotated into the 'planting' position, wherein the seed meter is structured and operable to substantially simultaneously, receive the sets of seed in the respective chamber positioned in the 'loading' position, parse the seeds from the respective chamber positioned in the 'planting' position, and evacuate the remaining seed from the respective chamber positioned in the 'evacuation' position.

2. The meter of claim 1, wherein each chamber comprises:
a top opening formed in a cylindrical side of the cylinder through which each seed set is deposited into the respective chamber; and
a bottom opening formed in a front panel of cylinder through which seed is presented to the seed separator for parsing.

3. The meter of claim 2, wherein the cylinder further comprises a plurality of singulator bins, each singulator bin disposed on a front panel of the cylinder radially outward from a respective one of the chamber bottom openings.

4. A seed meter, said seed meter comprising:
a seed handler, the seed handler comprising a cylinder, the cylinder comprising a plurality of seed chambers, the seed handler structured and operable to incrementally rotate the cylinder to sequentially position each seed chamber in a 'loading' position wherein the seed chamber receives a set of seeds, sequentially position each seed chamber in a 'planting' position wherein a particular number of seeds from each seed set are parsed from the seed chamber and transported to an exit chute for planting, and sequentially position each seed chamber in an 'evacuation' position wherein any seeds remaining in the chamber after parsing are evacuated from the chamber; and
a seed separator operably coupled to the seed handler, the seed separator comprising a seed disc rotationally disposed within a separator housing, the seed disc comprising a plurality of seed apertures disposed along an outer edge portion of the seed disc, the seed separator structured and operable rotate the seed disc such that seeds from each seed set are entrained on the seed apertures, via a vacuum supplied at each seed aperture, to parse the particular numbers of seed from each seed chamber and transport the seed to the exit chute as each seed chamber is incrementally rotated into the 'planting' position,
wherein the seed meter is structured and operable to substantially simultaneously, receive the sets of seed in the respective chamber positioned in the 'loading' position, parse the seeds from the respective chamber positioned in the 'planting' position, and evacuate the remaining seed from the respective chamber positioned in the 'evacuation' position.

5. The meter of claim 4, wherein each chamber comprises:
a top opening formed in a cylindrical side of the cylinder through which each seed set is deposited into the respective chamber; and
a bottom opening formed in a front panel of cylinder through which seed is presented to the seed disc for parsing.

6. The meter of claim 5 further comprising a plurality of pre-singulators attached to the front panel of the cylinder adjacent each bottom opening, each pre-singulator structured and operable to dislodge 'stacked' seeds that are lifted and removed from the respective seed set by a seed entrained on a seed aperture of the seed disc.

7. The meter of claim 5 further comprising a singulator disposed within the separator housing in proximity to a face of the seed disc and in proximity to a circular path of the entrained seeds as the seed disc parses seed from the respective chamber and transports the entrained seeds to the exit chute, the singulator structured and operable to dislodge seed in excess of one that are entrained on any seed aperture.

8. The meter of claim 7, wherein the cylinder comprises a plurality of singulator bins, each singulator bin disposed on a front panel of the cylinder radially outward from a respective one of the chamber bottom openings.

9. The meter of claim 8 further comprising a diverter disposed within the separator housing adjacent the singulator and above the singulator bin of the receptacle in the 'planting' position, the diverter structured and operable to deflect seeds dislodged by the singulator into one of the chamber in the 'planting' position or the corresponding singulator bin.

10. A seed planting system, said system comprising:
a seed source structured and operable to retain a plurality of seeds and to controllably dispense a plurality of sets of seeds; and
a seed meter fluidly connected to the seed source for receiving each set of seeds dispensed from the seed source, said seed meter comprising:
a seed handler, the seed handler comprising a cylinder, the cylinder comprising a plurality of seed chambers, the seed handler structured and operable to incrementally rotate the cylinder to sequentially position each seed chamber in a 'loading' position wherein the seed chamber receives a set of seeds, sequentially position each seed chamber in a 'planting' position wherein a particular number of seeds from each seed set are parsed from the seed chamber and transported to an exit chute for planting, and sequentially position each seed chamber in an 'evacuation' position wherein any seeds remaining in the chamber after parsing are evacuated from the chamber; and
a seed separator operably coupled to the seed handler, the seed separator comprising a seed disc rotationally disposed within a separator housing, the seed disc comprising a plurality of seed apertures disposed along an outer edge portion of the seed disc, the seed separator structured and operable rotate the seed disc such that seeds from each seed set are entrained on the seed apertures, via a vacuum supplied at each seed aperture, to parse the particular numbers of seed from each seed chamber and transport the seed to the exit chute as each seed chamber is incrementally rotated into the 'planting' position,
wherein the seed meter is structured and operable to substantially simultaneously, receive the sets of seed in the respective chamber positioned in the 'loading' position, parse the seeds from the respective chamber positioned in the 'planting' position, and evacuate the remaining seed from the respective chamber positioned in the 'evacuation' position.

11. The meter of claim 10, wherein each chamber comprises:
a top opening formed in a cylindrical side of the cylinder through which each seed set is deposited into the respective chamber; and
a bottom opening formed in a front panel of cylinder through which seed is presented to the seed disc for parsing.

12. The meter of claim 11 further comprising a plurality of pre-singulators attached to the front panel of the cylinder adjacent each bottom opening, each pre-singulator structured and operable to dislodge 'stacked' seeds that are lifted and removed from the respective seed set by a seed entrained on a seed aperture of the seed disc.

13. The meter of claim 11 further comprising a singulator disposed within the separator housing in proximity to a face of the seed disc and in proximity to a circular path of the entrained seeds as the seed disc parses seed from the respective chamber and transports the entrained seeds to the exit chute, the singulator structured and operable to dislodge seed in excess of one that are entrained on any seed aperture.

14. The meter of claim 13, wherein the cylinder comprises a plurality of singulator bins, each singulator bin disposed on a front panel of the cylinder radially outward from a respective one of the chamber bottom openings.

15. The meter of claim 14 further comprising a diverter disposed within the separator housing adjacent the singulator and above the singulator bin of the receptacle in the 'planting' position, the diverter structured and operable to deflect seeds dislodged by the singulator into one of the chamber in the 'planting' position or the corresponding singulator bin.

16. A method for parsing seed from a plurality of sets of seed, said method comprising:
sequentially dispensing a plurality of sets of seed from a seed source to an inlet of a seed meter, each set of seeds comprising a selected number of seeds having at least one selected trait, the seed meter comprising:
a seed handler, the seed handler comprising a cylinder, the cylinder comprising a plurality of seed chambers, and
a seed separator operably coupled to the seed handler, the seed separator comprising a seed disc rotationally disposed within a separator housing, the seed disc comprising a plurality of seed apertures disposed along an outer edge portion of the seed disc;
incrementally rotating the cylinder to sequentially position each seed chamber in a 'loading' position, a 'planting' position and an 'evacuation' position;
depositing a selected one of the plurality of sets of seed into the chamber positioned in the 'loading' position;
substantially simultaneously with depositing the selected set of seeds into the chamber positioned in the 'loading' position, parsing seeds from the chamber positioned in the 'planting' position by rotating the seed disc such that seeds from the chamber in the 'planting' position are entrained on the seed apertures, via a vacuum supplied at each seed aperture, and transported to the exit chute; and
substantially simultaneously with depositing the selected set of seeds into the chamber positioned in the 'loading' position and parsing the seeds from the chamber positioned in the 'planting', evacuating any seeds remaining in the chamber in the 'evacuation' position to an evacuation receptacle.

17. The method of claim 16, wherein
depositing the selected one of the plurality of sets of seed into the chamber positioned in the 'loading' position comprises depositing the selected one of the plurality of sets of seed into the chamber positioned in the 'loading' position through a top opening formed in a cylindrical side of the cylinder; and
parsing seeds from the chamber positioned in the 'planting' position by rotating the seed disc comprises parsing seeds from the chamber positioned in the 'planting' position by rotating the seed disc in proximity to a bottom opening formed in a front panel of cylinder through which seed is presented to the seed disc for parsing.

18. The method of claim 17 further comprising dislodging 'stacked' seeds that are lifted and removed from the respective seed set by a seed entrained on a seed aperture of the seed disc utilizing a plurality of pre-singulators attached to the front panel of the cylinder adjacent each bottom opening.

19. The method of claim 17 further comprising dislodging seed in excess of one that are entrained on any seed aperture utilizing a singulator disposed within the separator housing in proximity to a face of the seed disc and in proximity to a circular path of the entrained seeds as the seed disc parses seed from the respective chamber and transports the entrained seeds to the exit chute.

20. The method of claim 19, wherein dislodging seeds in excess of one that are entrained on any seed aperture utilizing the singulator comprises receiving seeds that are dislodged by the singulator in one of a plurality of singulator bins, wherein each singulator bin disposed on a front panel of the cylinder radially outward from a respective one of the chamber bottom openings, each singular bin.

21. The method of claim 20 wherein dislodging seeds in excess of one that are entrained on any seed aperture utilizing the singulator further comprises deflecting seeds dislodged by the singulator into one of the chamber in the 'planting' position or the corresponding singulator bin utilizing a diverter disposed within the separator housing adjacent the singulator and above the singulator bin of the receptacle in the 'planting' position.

22. A method for parsing seed from a plurality of sets of seed, said method comprising:
sequentially dispensing a plurality of sets of seed from a seed source to an inlet of a seed meter, each set of seeds comprising a selected number of seeds having at least one of selected trait, the seed meter comprising:
a seed handler, the seed handler comprising a cylinder, the cylinder comprising a plurality of seed chambers, and
a seed separator operably coupled to the seed handler;
incrementally rotating the cylinder to sequentially position each seed chamber in a 'loading' position, a 'planting' position and an 'evacuation' position;
depositing a selected one of the plurality of sets of seed into the chamber positioned in the 'loading' position;
substantially simultaneously with depositing the selected set of seeds into the chamber positioned in the 'loading' position, parsing seeds from the chamber positioned in the 'planting' position and transporting the parsed seeds to an exit chute; and
substantially simultaneously with depositing the selected set of seeds into the chamber positioned in the 'loading' position and parsing the seeds from the chamber positioned in the 'planting', evacuating any seeds remaining in the chamber in the 'evacuation' position to an evacuation receptacle.

* * * * *